United States Patent
Baber et al.

(10) Patent No.: US 6,722,047 B2
(45) Date of Patent: Apr. 20, 2004

(54) TOOL GUARD ATTACHMENT FOR A ROTARY HAND TOOL

(75) Inventors: Brad M. Baber, Chicago, IL (US); Wolfgang Hirschburger, Wilmette, IL (US); Ed Ennis, Niles, IL (US)

(73) Assignee: S-B Power Tool Company, Chicago, IL (US)

( * ) Notice: Subject to any disclaimer, the term of this patent is extended or adjusted under 35 U.S.C. 154(b) by 220 days.

(21) Appl. No.: 10/010,356

(22) Filed: Nov. 13, 2001

(65) Prior Publication Data

US 2003/0088988 A1 May 15, 2003

(51) Int. Cl.[7] .............................................. B23D 45/16
(52) U.S. Cl. ...................................... 30/391; 125/13.03
(58) Field of Search .......................... 30/390, 391, 368; 125/13.03; 451/358–362

(56) References Cited

U.S. PATENT DOCUMENTS

| | | |
|---|---|---|
| 2,366,017 A | 12/1944 | Fortune |
| 2,518,939 A | 8/1950 | Ross |
| 3,722,033 A | 3/1973 | Swan |
| 3,871,260 A | 3/1975 | Rees |
| 4,711,055 A | 12/1987 | Mickos |
| 5,020,281 A * | 6/1991 | Neff ..................... 451/358 X |
| 5,457,877 A | 10/1995 | McDermott |
| 5,974,674 A | 11/1999 | Kelly |
| 6,044,559 A | 4/2000 | Holst |
| 6,244,796 B1 | 6/2001 | Schuebel et al. |
| 6,264,408 B1 | 7/2001 | Lung et al. |

* cited by examiner

*Primary Examiner*—Douglas D. Watts
(74) *Attorney, Agent, or Firm*—Greer, Burns & Crain, Ltd.

(57) ABSTRACT

A tool guard attachment for a rotary hand tool of the type which has a housing with a nose portion from which an output shaft protrudes and which typically has a mechanism for holding tool bits or implements is disclosed. The tool guard attachment, which mounts to the nose portion of the rotary hand tool, has a guard housing with an enlarged guard portion at the outer end thereof which provides a shield or guard for a flat circular tool implement that is mounted on an arbor shaft assembly that in turn is connected by a U-joint to a drive shaft assembly at an acute angle relative to the arbor shaft assembly. The drive shaft assembly engages a driver nut or the like that is mounted to the output shaft of the rotary hand tool. The angle between the drive shaft and the arbor shaft is offset about 10 to 30° so that the rotary hand tool itself does not interfere with the cutting blade engaging a work surface at a perpendicular angle during operation. A lower guard that is retractable in the enlarged guard portion of the housing is normally biased away from the enlarged guard portion for protecting a user from injury.

19 Claims, 3 Drawing Sheets

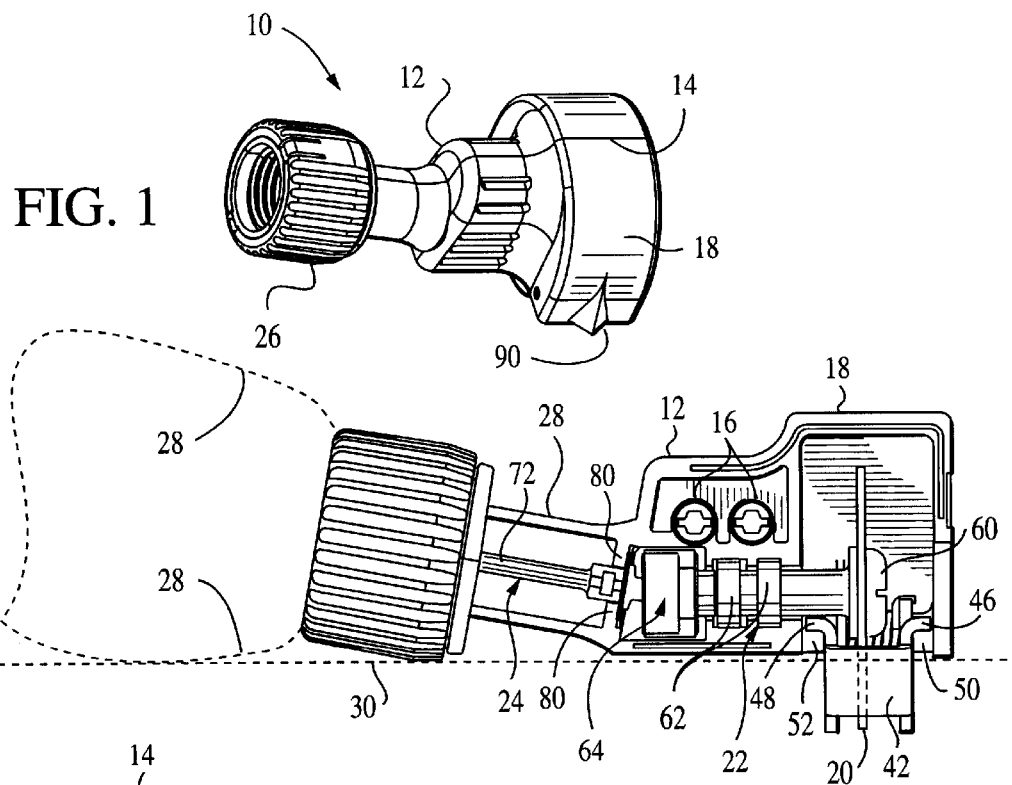
FIG. 1
FIG. 2
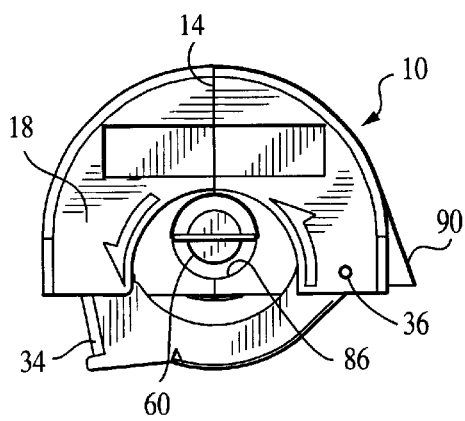
FIG. 3
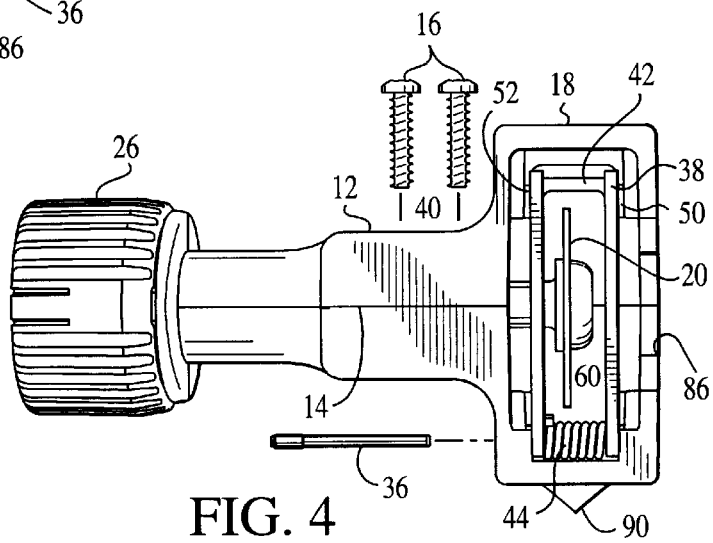
FIG. 4

TOOL GUARD ATTACHMENT FOR A ROTARY HAND TOOL

BACKGROUND OF THE INVENTION

The present invention generally relates to attachments for rotary hand tools and more particularly to a tool guard attachment for a flat circular tool implement that is to be used in connection with a powered rotary hand tool.

Small rotary hand tools have been marketed for many years for use in carrying out woodworking and metal working tasks by hobbyists as well as commercial artisans. Such small rotary hand tools generally have a motor unit with a rotary output shaft that extends from a nose portion of the tool housing. The output shaft typically includes an attachment mechanism for attaching various kinds of tool bits or implements such can be used to perform such tasks as grinding, carving, sawing, sanding and polishing, for example.

Various types of attachments are also currently available for use with rotary hand tools (such as those marketed under the Dremel brand made by the S-B Power Tool Company of Chicago, Ill.) to aid the user in performing specialized tasks more accurately or more efficiently. Such attachments include various guide attachments for controlling the tool while performing various tasks that relate to woodworking or other hobbies, as well as various commercial activities. Such attachments often significantly improve the accuracy and effectiveness of tool implements that are available for use in such rotary hand tools.

SUMMARY OF THE INVENTION

The present invention is a tool guard attachment for attachment to a rotary hand tool of the type which has a housing with a nose portion from which an output shaft protrudes and which typically has a mechanism for holding tool bits or implements. The tool guard attachment, which mounts to the nose portion of the rotary hand tool, has a guard housing with an enlarged guard portion at the outer end thereof which provides a shield or guard for a flat circular tool implement, preferably a saw blade, that is mounted on an arbor shaft assembly that in turn is connected by a U-joint to a drive shaft assembly at an acute angle relative to the arbor shaft assembly. The drive shaft assembly engages a driver nut or the like that is mounted to the output shaft of the rotary hand tool. The angle between the drive shaft and the arbor shaft is offset about 10 to 30° so that the rotary hand tool itself does not interfere with the cutting blade engaging a work surface at a perpendicular angle during operation. A lower guard that is retractable in the enlarged guard portion of the housing is normally biased away from the enlarged guard portion for protecting a user from injury. When a user positions the tool guard attachment for cutting, the user merely needs to press the attachment into contact with the work surface and the lower guard will retract into the enlarged guard portion and enable the saw blade to engage and penetrate into the work surface.

DESCRIPTION OF THE DRAWINGS

FIG. 1 is a perspective view of the tool guard attachment embodying the present invention;

FIG. 2 is a side view with portions removed of the tool guard attachment embodying the present invention;

FIG. 3 is a right end view of the apparatus shown in FIG. 1;

FIG. 4 is a bottom view with parts exploded of the tool guard attachment shown in FIG. 1;

DETAILED DESCRIPTION

Figure 5:
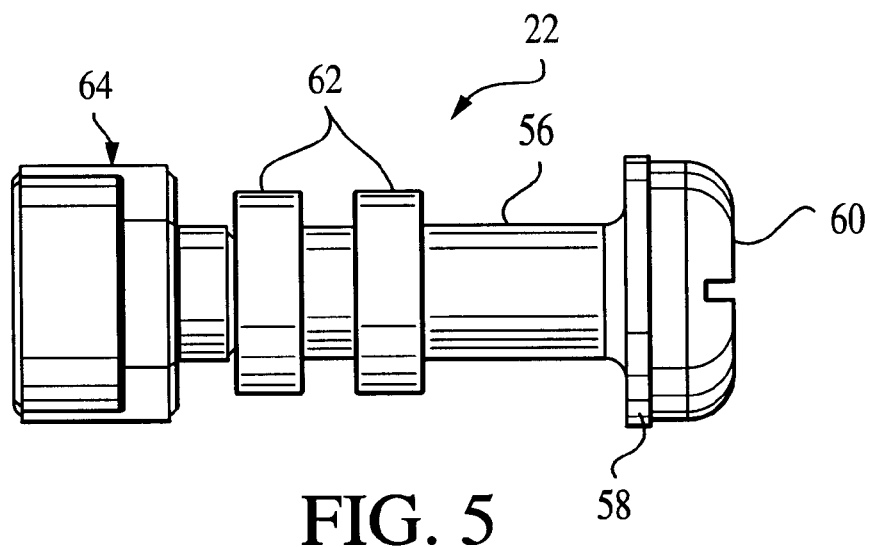
FIG. 5 is a plan view of the arbor shaft assembly of the attachment embodying the present invention.

Referring now to the drawings, and particularly FIGS. 1–4, a tool guard attachment, indicated generally at 10, is shown to include a housing 12 that is formed of two complementary pieces that are separated along a joint line 14, with the complementary pieces of housing 12 being attached to one another by a pair of screws 16. The housing 12 has an enlarged guard portion 18 that functions as a protective guard for a saw blade 20 or other cutting blade that is mounted to a arbor assembly, indicated generally at 22, contained in the housing 12 with the arbor shaft assembly being connected to a drive shaft assembly, indicated generally at 24. An attachment nut 26 is captively carried by and is rotatable on a smaller diameter generally cylindrically shaped mounting portion 28 for mounting the tool guard attachment 10 to a rotary hand tool, the outline of a portion of which is shown in phantom at 30.

As best shown in FIG. 2, the arbor shaft assembly 22 and drive shaft assembly 24 are oriented at an angle relative to one another that is preferably within the range of about 10° to 30°, and which in the preferred embodiment illustrated in the drawings is 11°. When the attachment 10 is mounted to a rotary hand tool, the rotary hand tool is oriented at an angle relative to the plane of the blade 20 so that the rotary hand tool 30 will not contact the surface of a workpiece when the blade is perpendicular to the workpiece surface as represented by the dotted line 32.

The arbor shaft assembly and drive shaft assembly are interconnected with a U-joint assembly that is comprised of two parts, one of which is located on each of the arbor shaft and drive shaft assemblies. The attachment 10 also has a lower guard 34 that is mounted to the enlarged guard portion 18 by pin 36 so the lower guard 34 may pivot relative to the guard portion 18. The lower guard 34 has side walls 38 and 40 that are located on opposite sides of the saw blade 20 and are connected together by bridging portion 42. A coiled spring 44 biases the lower guard away from the enlarged guard portion 18, i.e., downwardly as shown in FIGS. 2 and 3. The side walls include a pair of flanges 46 and 48 that extend outwardly of the side walls and engage inwardly directed shelves 50 and 52 of the enlarged guide portion 18 to limit the downward movement thereof to that shown in FIGS. 2 and 3.

Figure 7:
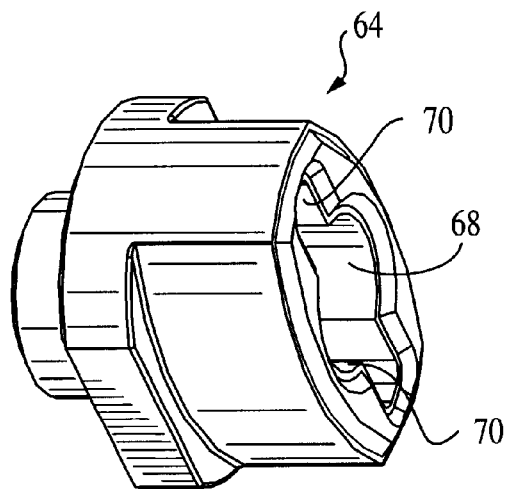
FIG. 7 is a perspective view of a U-joint socket that is part of the arbor shaft assembly of the preferred embodiment shown in FIG. 5.
Figure 8:
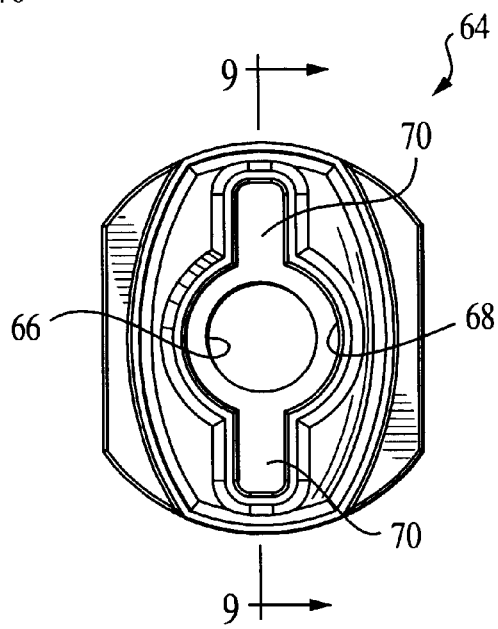
FIG. 8 is an end view of the U-joint socket shown in FIG. 7.
Figure 9:
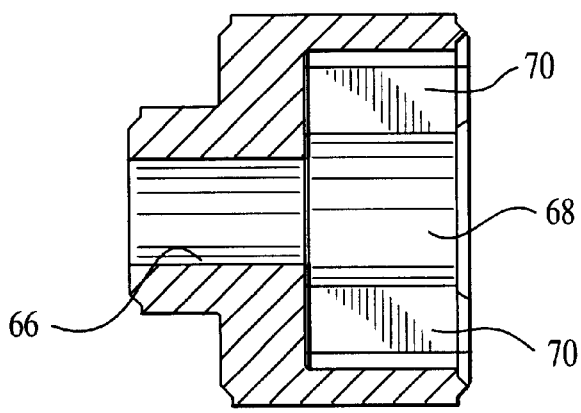
FIG. 9 is a cross-section of the U-joint socket and is taken along the line 9—9 of FIG. 8.

In accordance with an important aspect of the present invention and referring to FIG. 5, the arbor shaft assembly comprises a shaft 56 having an enlarged end 58 that has an internal aperture in which a large headed screw 60 may be secured. The screw 60 is for attaching the saw blade 20 to the arbor shaft 56. The shaft 56 is rotatable in a pair of bearings 62 which are located in suitable recesses of the housing 12. At the left end of the shaft 56 is a U-joint socket, indicated generally at 64, which is shown in detail in FIGS. 7–9. The socket has an aperture 66 which is sized to be preferably friction fit to the end of the shaft 56 and it has a larger cylindrical opening 68 at the opposite end thereof with opposed radially extended slots 70 that are substantially the same depth as the opening 68.

Figure 6:
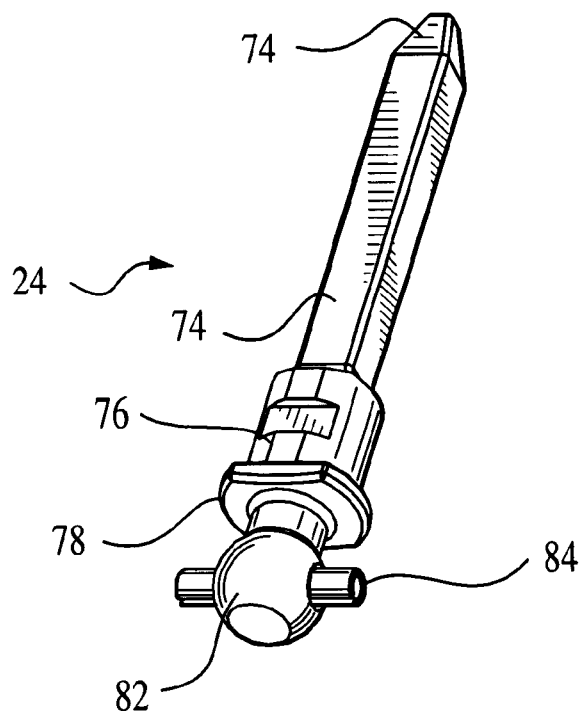
FIG. 6 is a perspective view of the drive shaft assembly of the present invention.

Referring to FIG. 6, the drive shaft assembly 24 is shown to have a drive shaft 72 having a pyramid shaped end portion 74 and a square cross section throughout a significant portion of its length. This shaft 72 adapted to engage a cooperatively shaped drive nut on the rotary hand tool output shaft so that the rotary hand tool can drive the shaft assemblies 22 and 24. At the opposite end of the drive shaft assembly 24 is a cylindrical portion 76 that is sized slightly smaller than an aperture in the mounting portion 28 of the housing (see FIG. 2) and the drive shaft assembly has an enlarged generally circular flange 78 which bears against a radial wall 80 of the mounting portion 28 to longitudinally position the drive shaft assembly in the mounting portion of the housing. At the outer end of the drive shaft assembly is a generally spherically shaped end 82 that has an aperture through which a pin 84 is placed and retained preferably by a force fit. The pin 84 is sized to be of a length that is smaller than the end to end distance of the slots 70 in the U-joint socket 64 and having a diameter that is less than the width of the slots 70. When the drive shaft assembly is properly positioned in the housing, the end 82 fits within the cylindrical opening 68 with the outwardly extending portions of the pin 84 fitting within the slots 70 to form a U-joint that enables the drive shaft assembly to drivingly rotate the arbor shaft assembly during operation.

While the preferred embodiment illustrated has the U-joint socket 64 attached to the arbor shaft assembly 22 and the spherical end 82 with its pin 84 attached to the drive shaft assembly, it should be understood that these components could be easily reversed if desired. Also, while the preferred embodiment has a pin 84 that extends from both sides of the spherical end, a single pin or extension may be utilized with a single slot 70 in the socket 64. Also, while it is preferred that the structure of the sphere 82 and pin 84 be one where a pin is placed in an aperture in the sphere 82, it is possible to integrally form such structure if desired.

To access the screw 60 to attach or remove the circular saw blade 20, an aperture 86 is provided in the end of the enlarged guard portion 18 so that it can be accessed by a user. It is preferred that the housing 12 be constructed of transparent plastic or plastic-like material so that a user can see the saw blade through the housing. In addition to being able to visibly observe the position of the saw blade 20, a pointed extension 90 is preferably provided with the point thereof being in the same plane as the saw blade itself. This further aids a user in positioning the blade relative to the work surface and which is being cut.

From the foregoing, it should be understood that an improved tool guard attachment has been shown and described which has many desirable attributes and advantages. The compact design enables sawing to be done perpendicular to a work surface because of the unique angular relationship between the arbor shaft assembly and drive shaft assembly. The presence of the retractable lower guard greatly increases the safety with which the attachment tool can be used. The unique design enables the lower guard to be retracted as soon as the attachment is placed in position to have the saw blade engage the work surface and the user need only to press downwardly on the attachment to easily retract the lower guard and engage the saw blade with the work piece.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A tool guard attachment for a rotary hand tool of the type which has a housing with a nose portion with an opening in which an output shaft is located, said attachment comprising:

a guard housing having an enlarged guard portion for surrounding a substantial portion of a generally flat circular tool implement mounted to the attachment, and a mounting portion extending from the guard portion for attaching the guard housing to the rotary hand tool;

a lower guard attached to said guard portion, said lower guard having extensions on opposite sides of the circular tool implement to protect a user from injury, said lower guard being normally biased away from said guard portion and being retractable by contact from a work surface as the circular tool implement is brought into engagement with a work piece surface;

an arbor shaft assembly including an elongated rotatable arbor shaft contained in said guard housing, said circular tool implement being mounted to said arbor shaft; and, a drive shaft assembly including an elongated rotatable drive shaft contained in said mounting portion;

said drive shaft assembly being operably connected to said arbor shaft assembly so that both of said drive and arbor shafts rotate together, said drive shaft being oriented at an angle relative to said arbor shaft that is less than about 20 degrees.

2. A tool guard attachment as defined in claim 1 wherein said lower guard has one end pivotally connected to said guard portion, and a spring operatively engaging said guard portion biasing said lower guard away from said guard portion.

3. A tool guard attachment as defined in claim 2 wherein said lower guard has two spaced apart side walls that are attached together by a bridging portion on at least one end, and a pin that extends through openings in said side walls and said guard portion for pivotally attaching the lower guard to said guard portion.

4. A tool guard attachment as defined in claim 3 wherein said lower guard has at least one outwardly extending flange and said enlarged guard portion having at least one inwardly directed shelf, whereby said flange engages said shelf to limit the travel of said lower guard away from said guard portion.

5. A tool guard attachment for a rotary hand tool of the type which has a housing with a nose portion with an opening in which an output shaft is located, said attachment comprising:

a guard housing having an enlarged guard portion for surrounding a substantial portion of a generally flat circular tool implement mounted to the attachment, and a mounting portion extending from the guard portion for attaching the guard housing to the rotary hand tool;

an arbor shaft assembly including an elongated rotatable arbor shaft contained in said guard housing, said circular tool implement being mounted to said arbor shaft, wherein said arbor shaft assembly comprises said arbor shaft, at least one bearing which is carried by said housing and in which said arbor shaft can rotate, the outer end of said shaft having a support surface and a threaded aperture in which a holding screw can be placed for mounting the circular tool implement to the arbor shaft, the inner end of said shaft having one of a U-joint socket or a U-joint driver for operably connecting said arbor shaft to said drive shaft;

a drive shaft assembly including an elongated rotatable drive shaft contained in said mounting portion;

said drive shaft assembly being operably connected to said arbor shaft assembly so that both of said drive and arbor shafts rotate together, said drive shaft being oriented at an angle relative to said arbor shaft that is less than about 20 degrees.

6. A tool guard attachment as defined in claim 5 wherein said drive shaft assembly comprises said elongated shaft having a polygonal cross section portion on one end thereof for engaging a cooperatively shaped output shaft attachment on the rotary hand tool and having one of a U-joint socket or a U-joint driver for operably connecting said drive shaft to said arbor shaft.

7. A tool guard attachment as defined in claim 6 wherein said U-joint socket comprises a socket member having one end with an aperture into which one of said arbor shaft or drive shaft is inserted, and an opposite end with a generally cylindrical opening concentric with said aperture, and at least one radially directed slot merging with said opening.

8. A tool guard attachment as defined in claim 6 wherein said U-joint driver comprises a generally cylindrically shaped end portion having at least one radially outwardly directed generally cylindrical extension, said cylindrically shaped end portion being sized to fit within said slot of said U-joint socket when said cylindrically shaped end portion is inserted into cylindrical opening of said U-joint socket.

9. A tool guard attachment as defined in claim 8 wherein said U-joint socket has a pair of opposed radially directed slots and said U-joint driver has a pair of outwardly directed generally cylindrical extensions extending on opposite sides of said cylindrically shaped end portion.

10. A tool guard attachment as defined in claim 1 wherein the rotary hand tool nose portion has external threads, said tool housing further comprises an attachment nut located on the free end of said mounting portion, said attachment nut being captively retained thereon and being rotatable relative thereto and having internal threads for engaging the external threads of the nose portion for attaching the guard housing to the rotary hand tool.

11. A tool guard attachment as defined in claim 1 wherein said guard housing comprises two complementary housing sections that are attached together.

12. A tool guard attachment for a rotary hand tool of the type which has a housing with a nose portion with an opening in which an output shaft is located, said attachment comprising:

a guard housing having an enlarged guard portion for surrounding a substantial portion of a generally flat circular tool implement mounted to the attachment, and a mounting portion extending from the guard portion for attaching the guard housing to the rotary hand tool;

an arbor shaft assembly including an elongated rotatable arbor shaft contained in said guard housing, said circular tool implement being mounted to said arbor shaft;

a drive shaft assembly including an elongated rotatable drive shaft contained in said mounting portion; and, a lower guard attached to said guard portion, said lower guard having spaced apart side walls located on opposite sides of the circular tool implement to protect a user from injury, said lower guard being normally biased away from said guard portion and being retractable by contact from a work surface as the circular tool implement is brought into engagement with a work piece surface;

said drive shaft assembly being rotatively coupled to said arbor shaft assembly, said drive shaft being oriented at an angle relative to said arbor shaft that is less than about 20 degrees.

13. A tool guard attachment as defined in claim 12 wherein said lower guard has outward extensions on said side walls for engagement with inward extending surfaces of said guard portion for limiting the movement of said lower guard to a position where the circular tool implement is not exposed to a user.

14. A tool guard attachment as defined in claim 13 wherein the bottom surface of said enlarged guard portion generally defines a plane that is parallel to and below said arbor shaft.

15. A tool guard attachment as defined in claim 12 wherein said guard housing is made of a transparent plastic material.

16. A tool guard attachment as defined in claim 12 wherein said guard portion has a outer pointed extension, the point of which is coplanar with the circular tool implement to facilitate positioning the circular tool implement by the user.

17. A tool guard attachment as defined in claim 14 wherein the rotary hand tool nose portion has external threads, said tool housing further comprises an attachment nut located on the free end of said mounting portion, said attachment nut being captively retained thereon and being rotatable relative thereto and having internal threads for engaging the external threads of the nose portion for attaching the guard housing to the rotary hand tool, said drive shaft being oriented at an angle relative to said arbor shaft whereby no part of the attachment nut is intersected by said plane, thereby enabling said circular tool implement to engage a work piece in a substantially perpendicular orientation.

18. A tool guard attachment as defined in claim 5 wherein the rotary hand tool nose portion has external threads, said tool housing further comprises an attachment nut located on the free end of said mounting portion, said attachment nut being captively retained thereon and being rotatable relative thereto and having internal threads for engaging the external threads of the nose portion for attaching the guard housing to the rotary hand tool.

19. A tool guard attachment as defined in claim 5 wherein said guard housing comprises two complementary housing sections that are attached together.

* * * * *